United States Patent
Stiot et al.

[11] 3,892,725
[45] July 1, 1975

[54] UNSATURATE CONTAINING AZO INDAZOLIUM DYESTUFFS

[75] Inventors: Jean-Pierre Henri Stiot, Les Elboeuf; Claude Marie Henri Emile Brouard, Sotteville, both of France

[73] Assignee: Produits Chimiques Ugine Kuhlmann, Paris, France

[22] Filed: Mar. 22, 1973

[21] Appl. No.: 343,763

[30] Foreign Application Priority Data
Mar. 24, 1972 France .......................... 72.10332

[52] U.S. Cl. .................. 260/157; 8/41 A; 260/205; 260/207.1; 260/465 E; 260/471 R; 260/518 R; 260/558 A
[51] Int. Cl. ............................... C09b 31/14
[58] Field of Search ................... 260/157

[56] References Cited
UNITED STATES PATENTS
| | | | |
|---|---|---|---|
| 2,883,373 | 4/1959 | Bossard et al. | 260/157 |
| 3,121,710 | 2/1964 | Sureau et al. | 260/157 |
| 3,578,654 | 5/1971 | Favre | 260/157 |

FOREIGN PATENTS OR APPLICATIONS
| | | | |
|---|---|---|---|
| 1,338,315 | 8/1963 | France | 260/157 |
| 1,364,647 | 5/1964 | France | 260/157 |
| 1,431,549 | 1/1966 | France | 260/157 |

*Primary Examiner*—Henry R. Jiles
*Assistant Examiner*—Robert W. Ramsuer

[57] ABSTRACT

Dyestuffs of the formula:

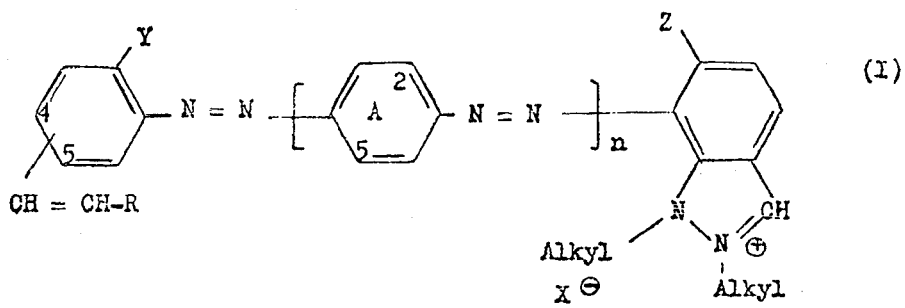

in which the group CH=CH—R is fixed in the position 4 or 5, R represents a CN, $CONH_2$ or COO—alkyl group, the alkyl residue having 1 to 5 carbon atoms, Y represents a hydrogen or chlorine atom, the benzene nucleus A is unsubstituted or substituted in the 2 and/or 5 positions by alkyl or alkoxy groups containing 1 to 5 carbon atoms, n is equal to 0 or 1, Z represents an OH or $NH_2$ group, the alkyl groups of the indazolium nucleus contain 1 or 2 carbon atoms and X represents a monovalent anion; processes for their preparation and their use in the colouration of fibres based on polyamides or polyesters containing acid groups. The dyestuffs of this invention have special interest for the dyeing of polymers and copolymers of acrylonitrile to which they impart yellow to scarlet shades.

5 Claims, No Drawings

UNSATURATE CONTAINING AZO INDAZOLIUM DYESTUFFS

The present invention relates to new basic azo dyestuffs, processes for their preparation, and their applications.

According to the present invention basic azo dyestuffs are provided of the general formula:

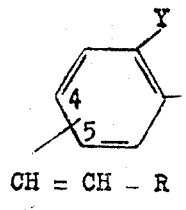 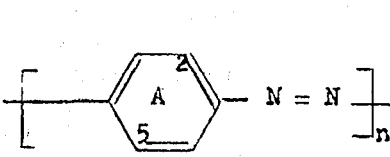 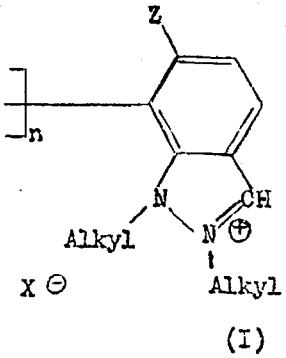

(I)

in which the group CH=CH—R is fixed in position 4 or 5, R represents a CN, CONH₂ or COO-alkyl group, the alkyl residue containing 1 to 5 carbon atoms, Y represents a hydrogen or chlorine atom, the benzene nucleus A is unsubstituted or substituted in the 2 and/or 5 positions by alkyl or alkoxy groups containing 1 to 5 carbon atoms, $n$ is equal to 0 or 1, Z represents an OH or NH₂ groups, the alkyl groups of the indazolium nucleus contain 1 or 2 carbon atoms and X represents a monovalent anion.

The dyestuffs of formula (I) in which $n$ is equal to 0 may be prepared for example by diazotising a bases of the general formula:

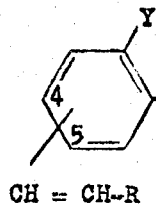

(II)

and coupling the diazo derivative obtained with a coupling compound of the general formula:

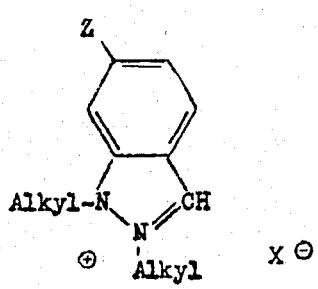

(III)

wherein Y, R, X, Z and alkyl having the same significance as above. Such coupling compounds are described in French Pat. Nos. 1,364,647 and 1,338,315.

The dyestuffs of formula (I) in which $n$ is equal to 1, may be prepared, for example, by coupling a diazo derivative of a base of formula (II) with an amine of the general formula:

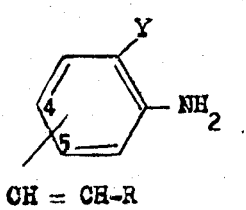

(IV)

diazotising the aminomonoazo dyestuff thus obtained and coupling with a coupling compound of formula (III).

Another method of preparation of the dyestuffs of formula (I) comprises subjecting an azo dyestuff of the general formula:

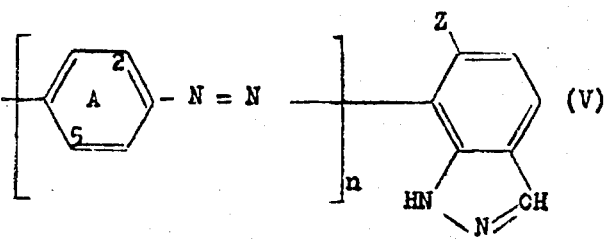

(V)

in which $n$, R, Y, Z have the same significance as above, to the action of an alkylating agent.

Examples of alkylating agents which may be used are alkyl halides, dialkyl sulphates and alkyl arylsulphonates. The alkylating treatment may be effected for example in an organic solvent, such as a benzene hydrocarbon for instance benzene, toluene, a xylene, chlorobenzene, dichlorobenzene, nitrobenzene, or in chloroform or dimethylformamide.

The bases of formula (II) in which R represents a cyano group may be prepared, for example by the Meerwein reaction applied to acrylonitrile and diazonium chlorides of m- or p-nitranilines possibly substituted by a chlorine atom in the ortho position, dehydrohalogenation by means of an alkaline agent such as sodium acetate and finally reduction of the nitro group.

The bases of formula (II) in which R represents a carbonamido group may be prepared by various methods for example by partial hydrolysis of the corresponding amino-cinnamonitriles; partial hydrolysis of the corresponding nitro-cinnamonitriles and reduction of the nitro group; or the Meerwein reaction applied to acrylamide and diazonium chlorides of m- or p-nitranilines possibly substituted in the ortho position by a chlorine atom, dehydrohalogenation by means of an alkaline agent such as sodium acetate and finally reduction of the nitro group.

The compounds of formula (II) in which R represents an alkoxycarbonyl group may be prepared by analogous processes for example by hydrolysis of the corresponding aminocinnamonitriles and esterification of the aminocinnamic acid; hydrolysis of the corresponding nitro-cinnamonitriles, esterification of the nitrocinnamic acid by means of an alcohol and reduction of the nitro group; or effecting the Meerwein reaction by reaction between an alkyl acrylate and the diazonium chloride of a nitraniline, dehydrohalogenation by means of an alkaline agent such as triethylamine and reduction of the nitro group.

The dyestuffs of formula (I) are generally very soluble in water. They have the tinctorial properties of the basic dyestuffs but have a special interest for the dyeing of fibres based on polymers and copolymers of acrylonitrile to which they impart yellow to scarlet shades, which are very uniform and have excellent general fastness. These dyestuffs also give remarkable tinctorial yields. They may also be used for dyeing fibres based on polyesters or polyamides chemically modified so that they contain acid groups. The colouration is imparted by the dyestuff cation, and the anion does not play any tinctorial role. It may be exchanged for another anion, for example, in order to improve the solubility of the dyestuffs.

The invention is illustrated by the following Examples in which the parts are parts by weight unless the contrary is stated.

EXAMPLE 1

A mixture of 120 parts of acrylonitrile and 1000 parts of acetone is introduced into a solution of the diazo derivatives obtained from 276 parts of p-nitraniline. Then 40 parts of cupric chloride crystallised with 2 molecules of water are added and the mixture is kept vigorously stirred. The evolution of nitrogen is exothermic and the temperature must be maintained at 30°-32°C, by means of a cooling bath. After the diazonium chloride has disappeared (six hours), the yellow leaflets which melt at 108°C are filtered off. After recrystallising from methanol, 330 parts of 2-chloro-4'-nitro-3-phenyl-propionitrile, which melts at 112°C, are obtained. The product is then dehydrohalogenated by means of 200 parts of crystalline sodium acetate in a mixture of 340 parts of water and 800 parts of ethyl alcohol. The mixture is heated under reflux for 12 hours and 225 parts of 4-nitro-cinnamonitrile, which melts at 202°C., are isolated in the cold.

The 4-nitro-cinnamonitrile thus obtained is then reduced by the Bechamp reaction in 2000 parts of water and 800 parts of ethyl alcohol. 4-amino-cinnamonitrile are thus obtained which melts at 109°-110°C. Yield: 76%

| Analysis | C% | H% | N% |
|---|---|---|---|
| Calculated for $C_9H_8N_2$ | 75.00 | 5.55 | 19.44 |
| Found | 75.02 | 5.77 | 19.25 |

72 parts of 4-amino-cinnamonitrile are gradually added to 85 parts of 66° Be sulphuric acid diluted with 15 parts of water. The temperature rises spontaneously to 100°-105°C. It is maintained at this until the addition is complete, then heated for 50 minutes at 100°-105°C., cooled to 20°C and poured on to 100 parts of water and 200 parts of ice. The product is neutralised by adding 170 parts of a 35° Be solution of sodium hydroxide, the temperature being maintained at 10°-20°C. It is filtered and dried, 56 parts of 4-amino-cinnamamide being thus obtained. It is recrystallised from 400 parts of monochlorobenzene. M.p. 200°C.

| Analysis: | C% | H% | N% |
|---|---|---|---|
| Calculated for $C_9H_{10}ON_2$ | 66.66 | 6.17 | 17.28 |
| Found | 66.30 | 6.28 | 17.34 |

EXAMPLE 2

72 parts of 4-amino-cinnamonitrile are introduced into 250 parts of 20% sodium hydroxide solution. The mixture is heated for 3 hours under reflux until ammonia is no longer evolved, then cooled, neutralised with 140 parts of 19° Be hydrochloric acid, filtered off at 20°C and the product is recrystallised from 300 parts of water. 4-Amino-cinnamic acid is thus obtained. M.p 175°C. Yield 71%.

| Analysis: | C% | H% | N% |
|---|---|---|---|
| Calculated for $C_9H_9O_2N$ | 66.25 | 5.52 | 8.58 |
| Found | 66.26 | 5.47 | 8.64 |

32.6 parts of 4-aminocinnamic acid are heated under reflux for three hours in a mixture comprising 100 parts of absolute ethyl alcohol and 20 parts of 66° Be sulphuric acid. The product is poured on 200 parts of water and 200 parts of ice, the pH is adjusted to 8 by the addition of 38 parts of 35° Be sodium hydroxide solution, and the product is filtered off, washed with water and recrystallised from 150 parts of ethyl alcohol and 150 parts of water. Ethyl 4-amino-cinnamate is thus obtained Yield 78%. M.p. 68°-69°C.

| Analysis: | C% | H% | N% |
|---|---|---|---|
| Calculated for $C_{11}H_{13}O_2N$ | 69.10 | 6.80 | 7.32 |
| Found | 69.32 | 6.72 | 7.28 |

EXAMPLE 3

3.6 parts of 4-amino-cinnamonitrile are made into a paste in 7.5 parts of 19° Be hydrochloric acid and 50 parts of water. The mixture is stirred for 30 minutes, 100 parts of ice are added and it is diazotised with a solution of 2 parts of sodium nitrite in 2 parts of water. The excess nitrous acid is eliminated by the addition of sulphamic acid, the diazonium salt thus obtained is run into a solution of 5.8 parts of 100% 1,2-dimethyl-6-hydroxy-indazolium chloride in 75 parts of water containing 7.5 parts of 25% ammonia, and is left overnight with stirring. It is then filtered and 9 parts of 4'-cyanovinyl-7-phenylazo-6-hydroxy-1,2-dimethyl-indazolium chloride are obtained. This dyestuff dyes fibres based on polymers and copolymers of acrylonitrile a very bright orange shade which has good general fastness.

EXAMPLE 4

3.6 parts of 4-amino-cinnamonitrile are diazotised as in Example 3. The diazonium salt obtained is run into a solution of 6.2 parts of 100% 1,2-dimethyl-6-amino-indazolium chloride in 100 parts of water. It is left overnight with stirring, filtered and 8 parts of 4'-cyanovinyl-7-phenylazo-6-amino-1,2-dimethyl-indazolium chloride are obtained. This dyestuff dyes polymers and copolymers based on acrylonitrile a very bright golden yellow shade which has excellent general fastness.

The following Table summarises a number of monoazo dyestuffs obtained by the processes of Examples 3 and 4 in the form of the chloride. The shades given are those obtained on acrylic fibres.

The initials HDMI, ADMI, HDEI and ADEI indicate respectively the residues "6-hydroxy-1,2-dimethyl-indazolium", "6-amino-1,2-dimethyl-indazolium", "6-hydroxy-1,2-diethyl-indazolium" and "6-amino-1,2-diethyl-indazolium".

| Example | azo-indazolium dyestuffs | Shades |
|---|---|---|
| 5 | 5'-cyanovinyl-7-phenylazo HDMI | orange |
| 6 | 4'-cyanovinyl-2'-chloro-7-phenylazo HDMI | " |
| 7 | 5'-cyanovinyl-2'-chloro-7-phenylazo HDMI | " |
| 8 | 4'-ethoxycarbonylvinyl-7-phenylazo HDMI | orange |
| 9 | 5'-ethoxycarbonylvinyl-7-phenylazo HDMI | " |
| 10 | 4'-ethoxycarbonylvinyl-2'-chloro-7-phenylazo HDMI | " |
| 11 | 5'-ethoxycarbonylvinyl-2'-chloro-7-phenylazo HDMI | " |
| 12 | 5'-cyanovinyl-7-phenylazo ADMI | yellow |
| 13 | 4'-cyanovinyl-2'-chloro-7-phenylazo ADMI | orange yellow |
| 14 | 5'-cyanovinyl-2'-chloro-7-phenylazo ADMI | golden yellow |
| 15 | 4'-ethoxycarbonylvinyl-7-phenylazo ADMI | " |
| 16 | 5'-ethoxycarbonylvinyl-7-phenylazo ADMI | yellow |
| 17 | 2'-chloro-4'-ethoxycarbonylvinyl-7-phenylazo ADMI | orange yellow |
| 18 | 2'-chloro-5'-ethoxycarbonylvinyl-7-phenylazo ADMI | golden yellow |
| 19 | 4'-carbamoylvinyl-7-phenylazo HDEI | orange |
| 20 | 5'-carbamoylvinyl-7-phenylazo HDEI | orange |
| 21 | 2'-chloro-4'-carbamoylvinyl-7-phenylazo HDEI | " |
| 22 | 2'-chloro-5'-carbamoylvinyl-7-phenylazo HDEI | " |
| 23 | 4'-carbamoylvinylk-7-phenylazo ADEI | golden yellow |
| 24 | 5'-carbamoylvinyl-7-phenylazo ADEI | yellow |
| 25 | 2'-chloro-4'-carbamoylvinyl-7-phenylazo ADEI | orange yellow |
| 26 | 2'-chloro-5'-carbamoylvinyl-7-phenylazo ADEI | golden yellow |

EXAMPLE 27

7.2 parts of 4-amino-cinnamonitrile are made into a paste in 15 parts of 19°Be hydrochloric acid and 100 parts of water. The mixture is stirred for 30 minutes, 200 parts of ice are added and it is diazotised by the addition of 8 parts of a 50% solution of sodium nitrite. The excess nitrous acid is destroyed by the addition of sulphamic acid. 6 parts of metatoluidine dissolved in 10 parts of 11°Be hydrochloric acid are run into the solution of the diazonium salt. The pH is adjusted to 4–4.5 by the addition of 50 parts of 20% sodium acetate. The mixture is left overnight with stirring, then the solid is filtered off, washed with slightly acidified water and drained. The paste thus obtained containing 4'-cyanovinyl-4-amino-2-methyl-azobenzene is stirred for two hours in 30 parts of 19° Be hydrochloric acid containing 60 parts of water. 200 parts of ice are added and diazotisation is effected by the addition of 7.5 parts of a 50% sodium nitrite solution. The mixture is stirred for 30 minutes, the excess nitrous acid is destroyed by the addition of sulphamic acid, then it is filtered and the solution thus obtained is run into 12.4 parts of 1,2-dimethyl-6-amino-indazolium chloride dissolved in 200 parts of water. The product is left overnight with stirring and filtered. 16 parts of 4'-(cyano-vinyl-phenylazo)-3'-methyl-7-phenylazo-6-amino-1,2-dimethyl-indazolium chloride are obtained. This dyestuff dyes fibres based on acrylonitrile in a scarlet shade having good fastness.

The following Table summarises a number of disazo dyestuffs obtained by the process of Example 27 in the form of the chloride. The shades given are those of acrylic fibres.

| Example | disazo-indazolium dyestuffs | Shades |
|---|---|---|
| 28 | 4'-(4-cyanovinyl-phenylazo)-7-phenylazo HDMI | red orange |
| 29 | 4'-(4-cyanovinyl-phenylazo)-3'-methyl-7-phenylazo HDMI | scarlet |
| 30 | 4'-(4-carbamoylvinyl-phenylazo)-2'-methoxy-7-phenylazo HDMI | " |
| 31 | 4'-(4-methoxycarbonylvinyl-phenylazo)-3'-methyl-7-phenylazo HDMI | " |
| 32 | 4'-(2-chloro-4-cyanovinyl-phenylazo)-3'-methoxy-7-phenylazo ADMI | orange |
| 33 | 4'-(2-chloro-4-carbamoylvinyl-phenylazo)-7-phenylazo ADMI | " |
| 34 | 4'-(4-ethoxycarbonylvinyl-phenylazo)-2'-methoxy-5'-methyl-7-phenylazo ADMI | " |

EXAMPLE 35

50 parts of acrylic fibres are immersed in a dyebath containing 1000 parts of water and 100 parts of 1% acetic acid. 50 parts of polyethoxylated oleylamine are added and then 1 part of the dyestuff of Example 4. The temperature is raised rapidly to 95°C, and the bath is maintained at this temperature for an hour, and the fibres are rinsed in cold water. A fibre dyed a very bright golden yellow shade is thus obtained which has excellent general fastness.

We claim:
1. A dyestuff of the formula:

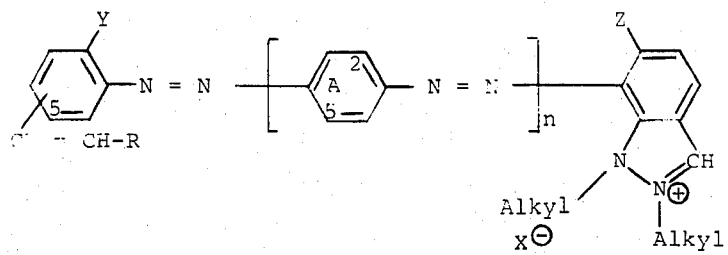

in which the group CH=CH—R is fixed in the position 4 or 5, R represents CN, CONH$_2$ or COO-alkyl, wherein the alkyl group contains 1 to 5 carbon atoms, Y represents H or Cl, the benzene nucleus A is unsubstituted or substituted in the 2 and/or 5 positions by alkyl or alkoxy groups containing 1 to 5 carbon atoms, $n$ is equal to 0 or 1, Z represents an OH or NH$_2$ group, the alkyl groups of the indazolium nucleus contain 1 or 2 carbon atoms and X represents a monovalent anion.

2. A dyestuff according to claim 1 which is 4'-cyanovinyl-7-phenylazo-6-hydroxy-1,2-dimethyl-indazolium chloride.

3. A dyestuff according to claim 1 which is 4'-cyanovinyl-7-phenylazo-6-amino-1,2-dimethyl-indazolium chloride.

4. A dyestuff according to claim 1 which is 4'-(cyanovinyl-phenylazo)-3'-methyl-7-phenylazo-6-amino-1,2-dimethyl-indazolium chloride.

5. A dyestuff according to claim 1 which is 4'-(4-cyanovinyl-phenylazo)-7-phenylazo-6-hydroxy-1,2-dimethyl-indazolium chloride.

* * * * *